Figure 3:
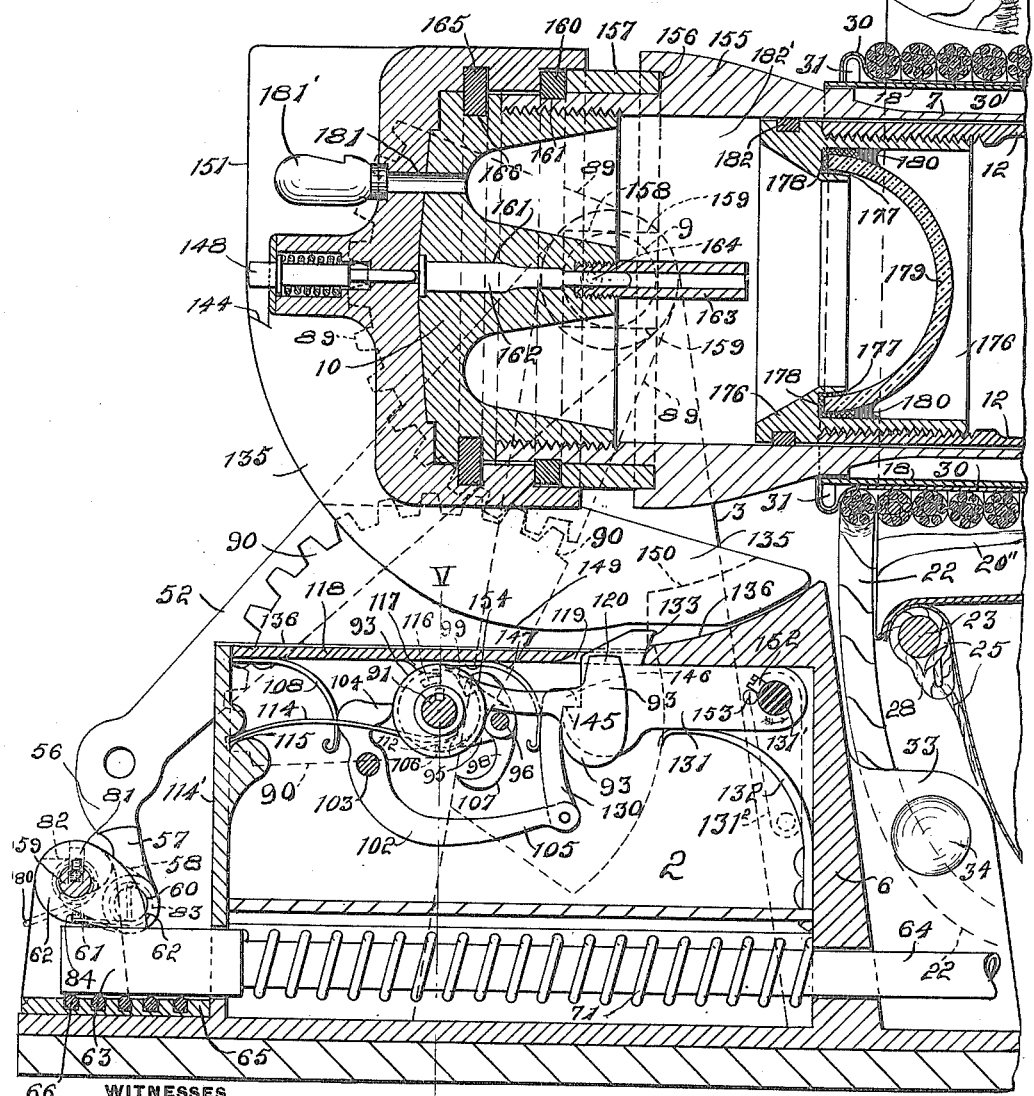

J. H. KENDIG.
SAFETY APPLIANCE FOR FLYING MACHINES.
APPLICATION FILED SEPT. 20, 1911. RENEWED NOV. 16, 1917.
1,270,419.
Patented June 25, 1918.
8 SHEETS—SHEET 1.
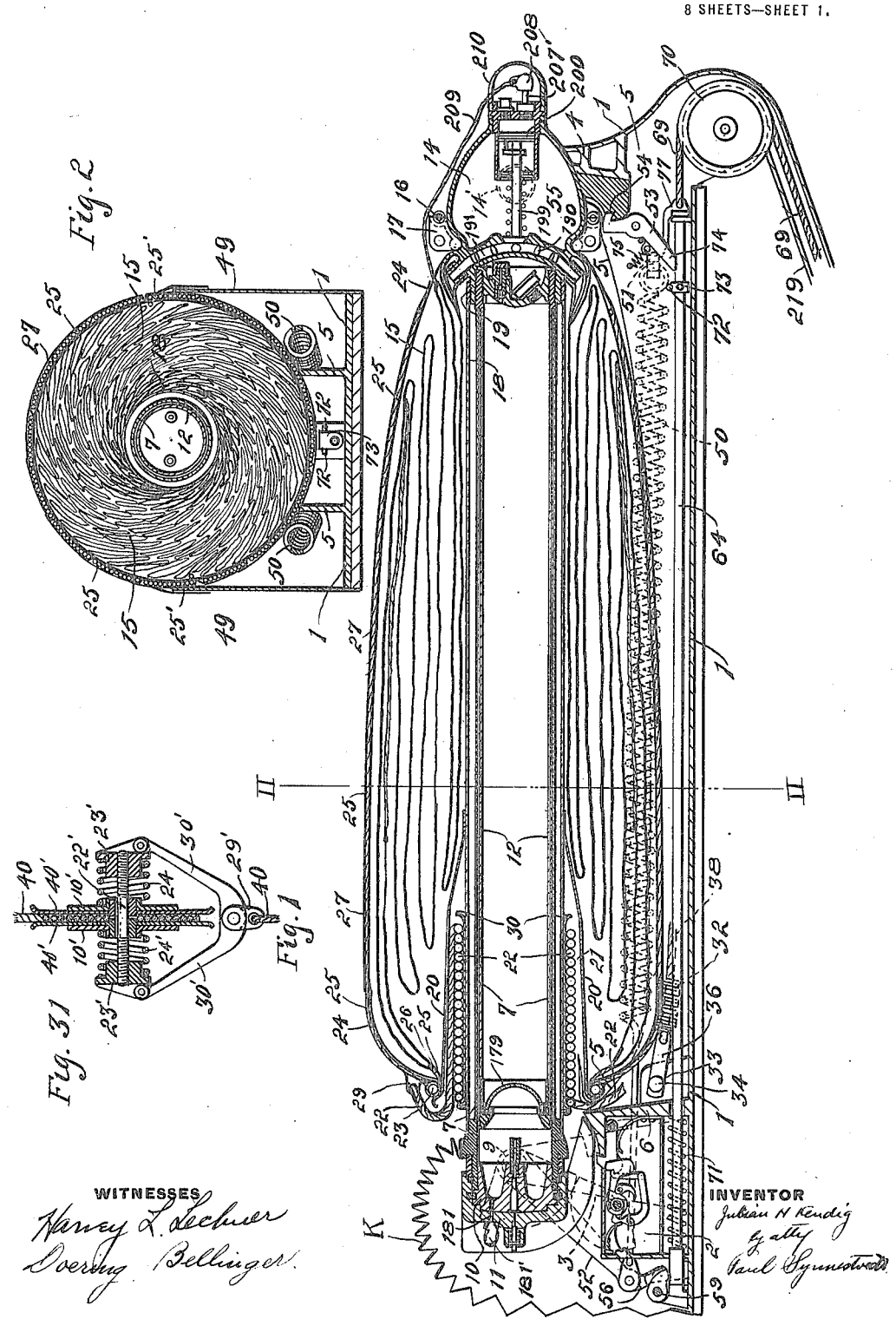

J. H. KENDIG.
SAFETY APPLIANCE FOR FLYING MACHINES.
APPLICATION FILED SEPT. 20, 1911. RENEWED NOV. 16, 1917.

1,270,419.

Patented June 25, 1918.
8 SHEETS—SHEET 2.

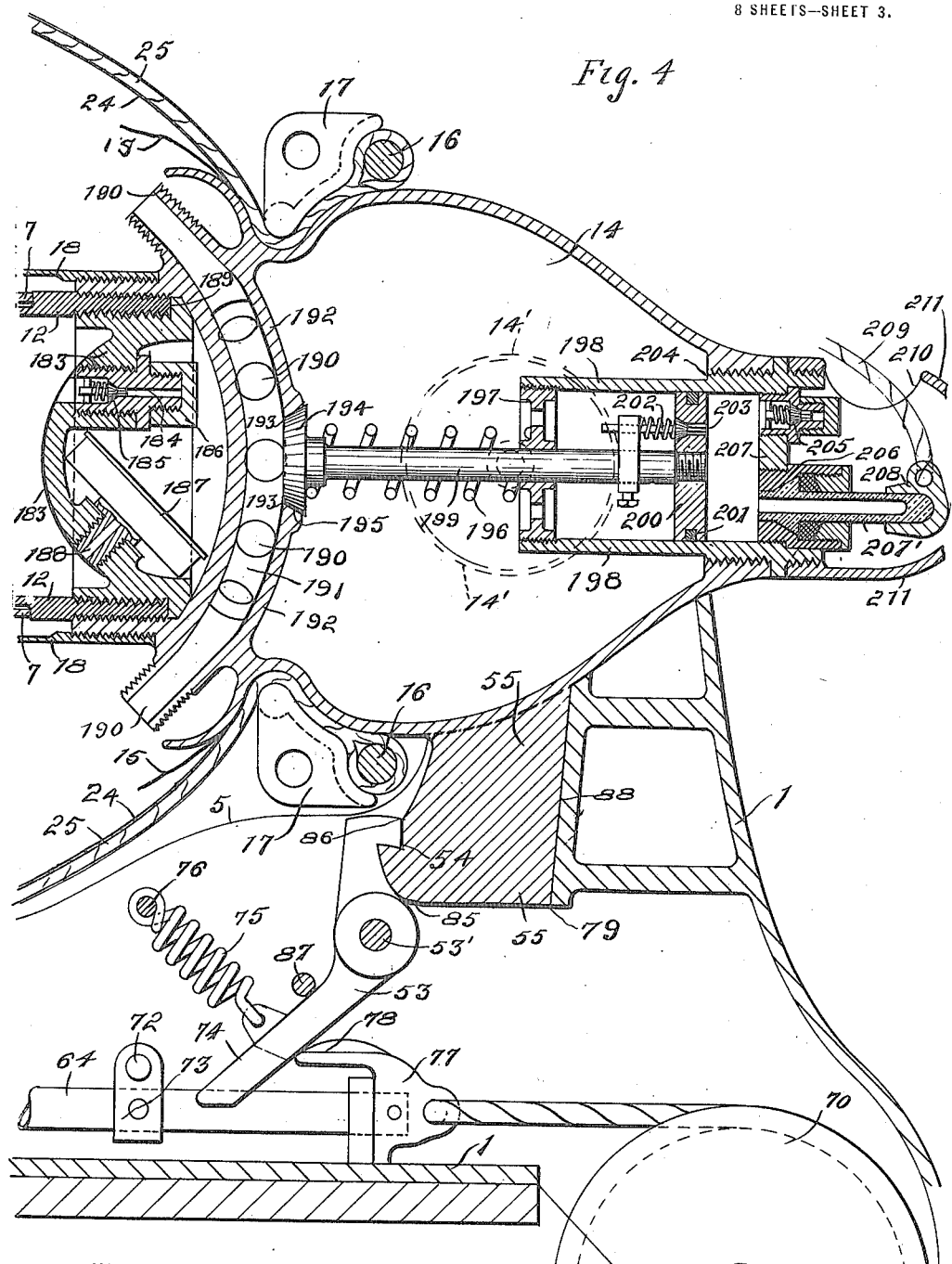

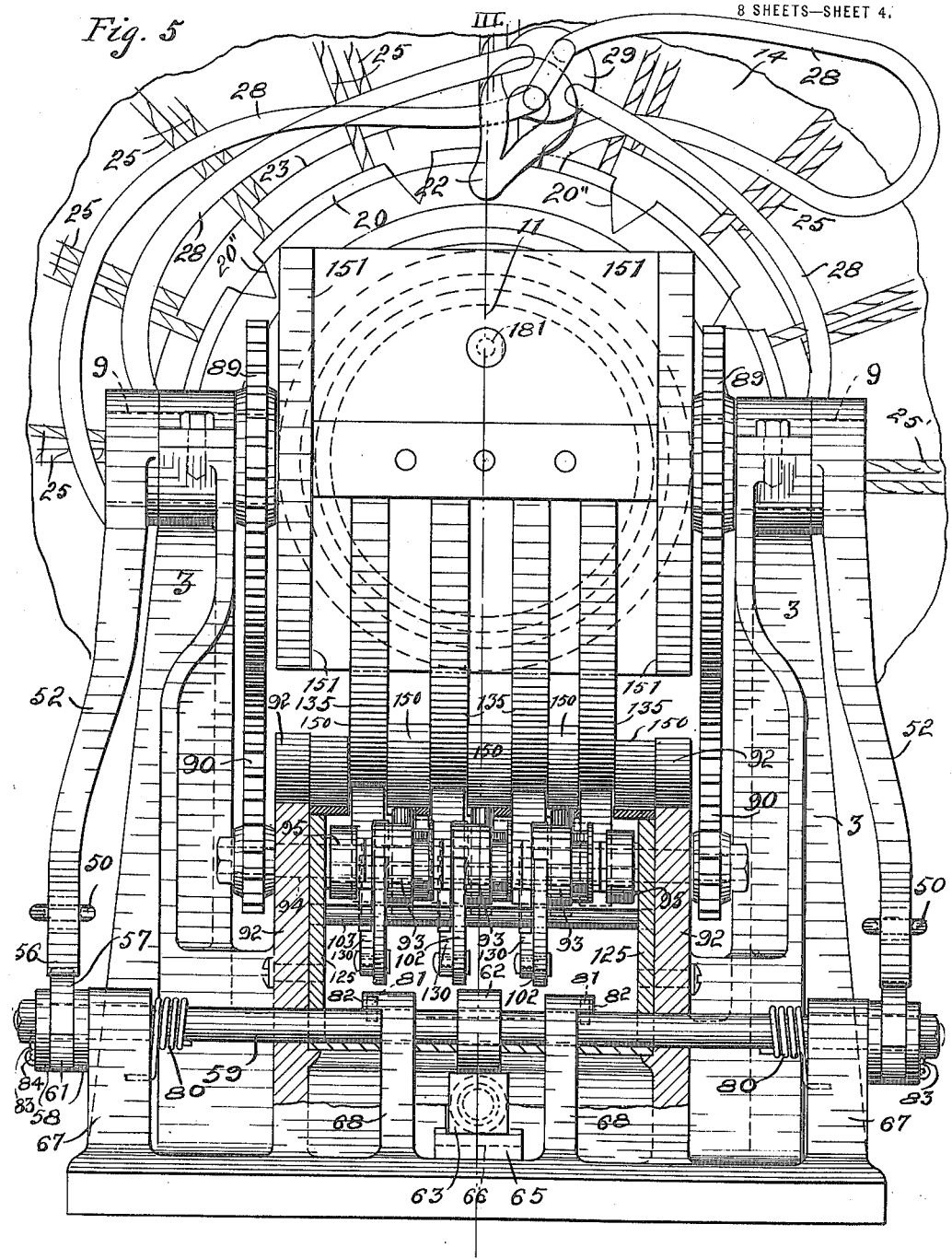

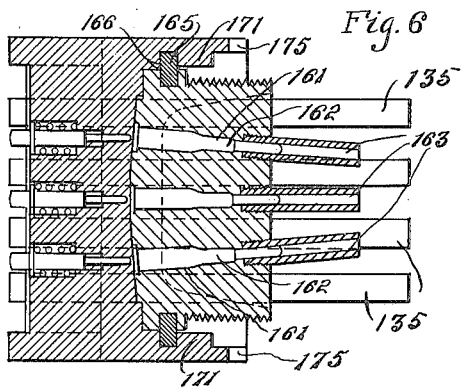
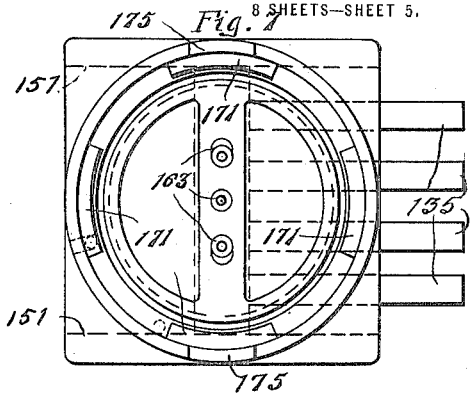
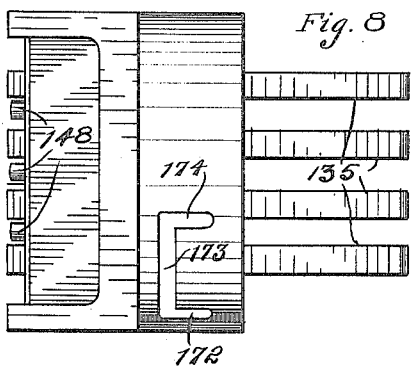
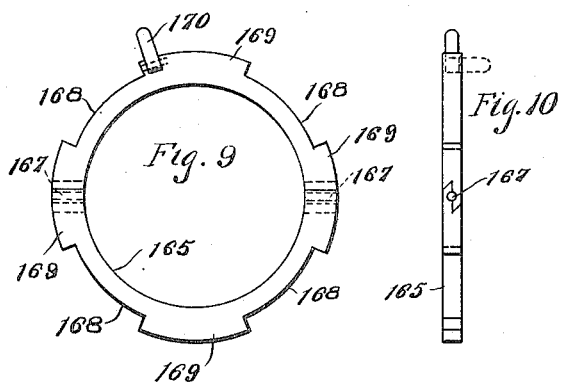
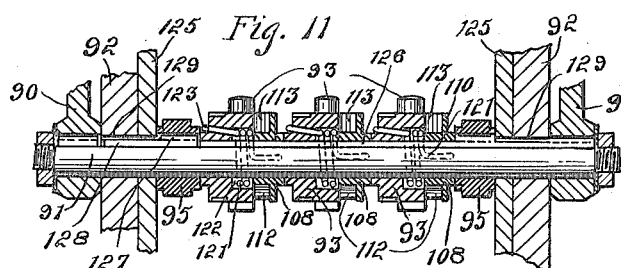
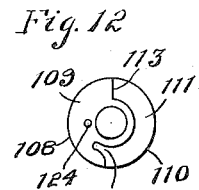
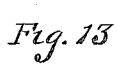
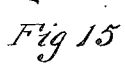
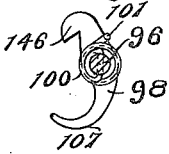
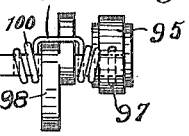

J. H. KENDIG.
SAFETY APPLIANCE FOR FLYING MACHINES.
APPLICATION FILED SEPT. 20, 1911. RENEWED NOV. 16, 1917.
1,270,419. Patented June 25, 1918.
8 SHEETS—SHEET 6.
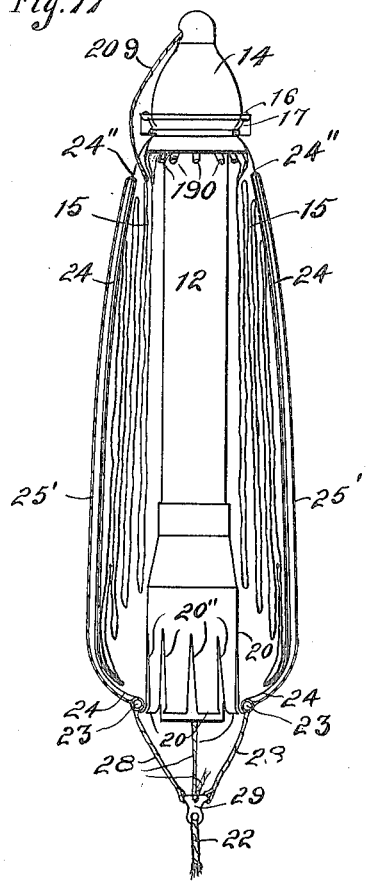
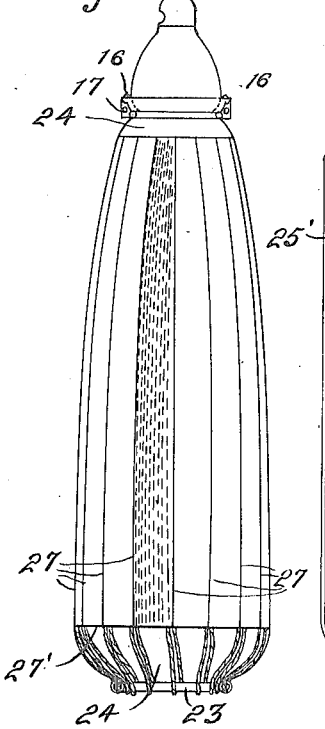
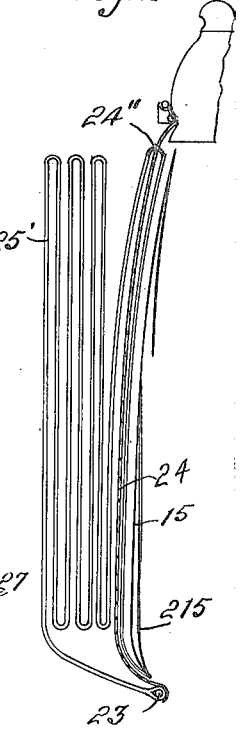
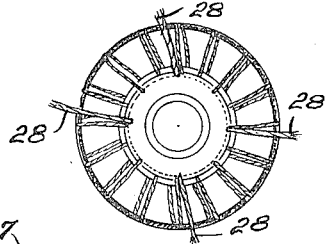
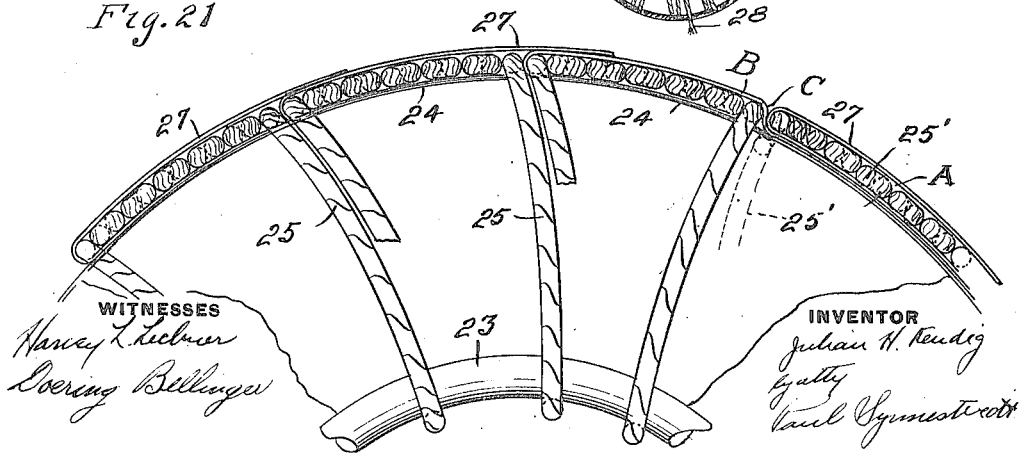

J. H. KENDIG.
SAFETY APPLIANCE FOR FLYING MACHINES.
APPLICATION FILED SEPT. 20, 1911. RENEWED NOV. 16, 1917.
1,270,419.
Patented June 25, 1918.
8 SHEETS—SHEET 7.
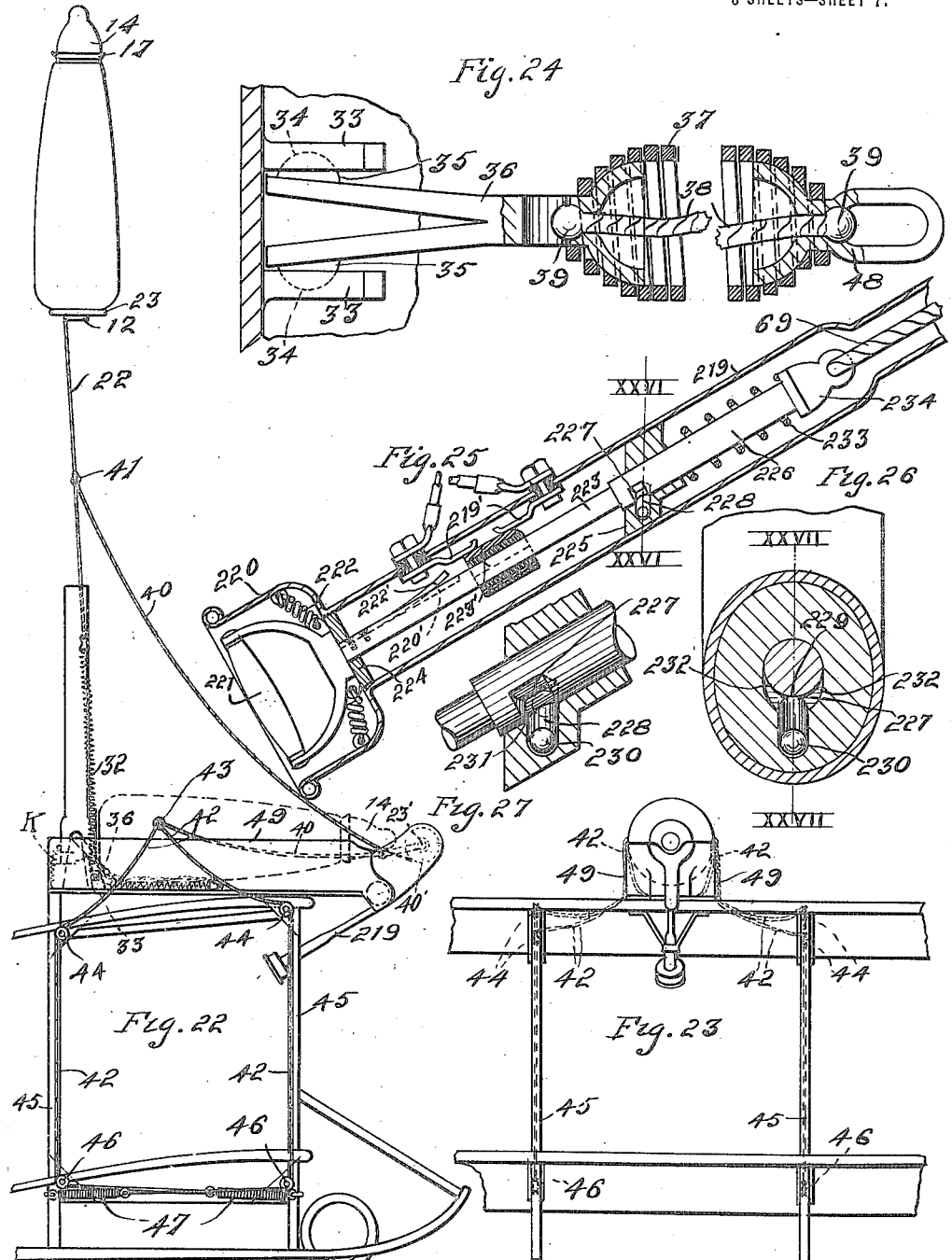

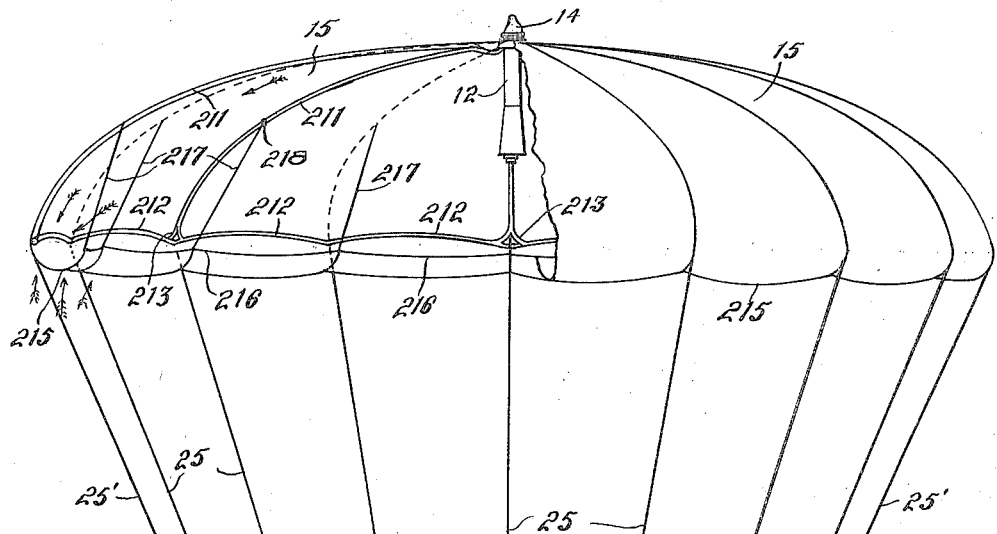
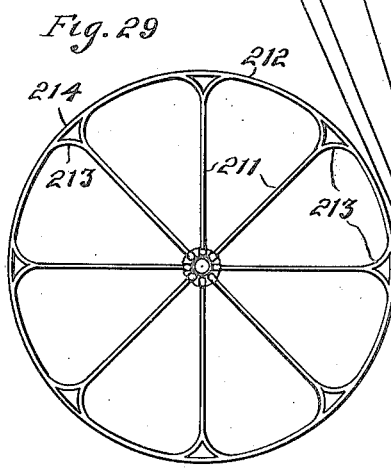
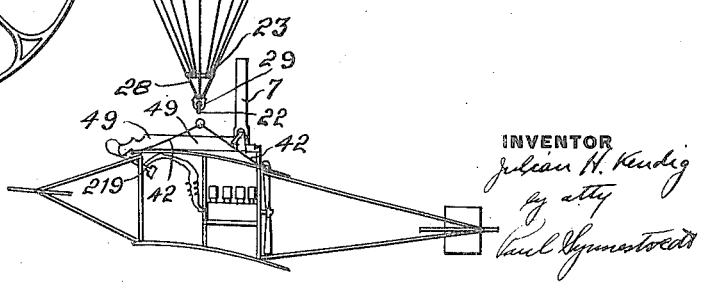

UNITED STATES PATENT OFFICE.

JULIAN H. KENDIG, OF PITTSBURGH, PENNSYLVANIA.

SAFETY APPLIANCE FOR FLYING-MACHINES.

1,270,419.　　　　Specification of Letters Patent.　　Patented June 25, 1918.

Application filed September 20, 1911, Serial No. 650,435. Renewed November 16, 1917. Serial No. 202,307.

*To all whom it may concern:*

Be it known that I, JULIAN H. KENDIG, a citizen of the United States, residing at Pittsburgh, in the county of Allegheny and State of Pennsylvania, have invented certain new and useful Improvements in Safety Appliances for Flying-Machines, of which the following is a specification.

This invention relates to such safety appliances as may be brought into operation when the flying machine is disabled or for any other reason the machine is in danger of falling, for the purpose of saving both the machine and aviator from disaster by retarding the descent of the machine or aviator to a safe landing velocity by the aid of an expanding parachute. Among the objects of my invention are; the provision of a device that is of sufficient size to accomplish the safe landing from a high elevation of either the flying machine or its aviator in case of an accident; to so construct the device that it may be carried by the flying machine and when not in operative position will occupy a minimum of space and offer a minimum of air resistance; the provision of a device which is of sufficient strength to withstand all strains incident to such service and at the same time have a minimum of weight. My invention further contemplates a construction that, when the emergency arises for its use, can be released instantly by the aviator and the parachute immediately expanded at a safe distance, clear of the flying machine; the provision of means whereby the parachute is carried to such a position in a form offering a minimum of resistance to the air, and means whereby the opening of the parachute is facilitated and accomplished at a lower vertical falling velocity than is common with parachutes. It is still further intended to provide means whereby all ropes are so folded that there will be no danger of their becoming entangled; to provide means of so folding the parachute that it may be thrown bodily or discharged from the flying machine and stripped free to expand at a predetermined point; the provision of means to release compressed gases into the tubular framework at such time, the said framework being provided to expand the parachute; the provision of improved means to secure a maximum spread of the parachute, and the provision of a safe, elastic and certain means of projecting the parachute away from the flying machine. These and such other objects as may hereinafter appear, or are incidental to my invention, I attain by means of a construction illustrated in the accompanying drawings, in preferred form.

Of the drawings, Figure 1 a longitudinal section through the apparatus; Fig. 2 is a section on the line II—II of Fig. 1 looking toward the front end of the apparatus; Fig. 3 is a longitudinal section through the apparatus on the line III—III of Fig. 5 at the rear portion; Fig. 4 is a similar section of the front portion; Fig. 5 is an end view of the device on the line V—V of Fig. 3, with certain portions of the casing broken away to show the firing mechanism; Fig. 6 is a section on the line VI—VI of Fig. 7; Fig. 7 is an end view of the locking head; Fig. 8 is a plan view of the locking head; Fig. 9 is a face view of the head locking ring; Fig. 10 is a side view of the head locking ring; Fig. 11 is a section of a detail of my invention showing the mounting of the hammers and cocking apparatus; Fig. 12 is a side view of a sleeve of the cocking device; Fig. 13 is a side view of the cocking arm or crank which carries the cocking shaft; Fig. 14 is a side view of the cocking dog and the spring which holds it to the hammer; Fig. 15 is a face view of the cocking dog and crank arm carrying the cocking shaft; Fig. 16 is a side view of the hammer; Fig. 17 is a section showing diagrammatically the folding of the parachute about the projectile, and the folding of two guy ropes which rip the casing when stripping; Fig. 18 is a side view of the exterior of the parachute folded, showing the folding of the guy ropes beneath the oil paper flap about the exterior; Fig. 19 is an end view of Fig. 18; Fig. 20 is a diagrammatic showing of the guy rope which rips the envelop when stripping; Fig. 21 is an enlarged portion of Fig. 19; Fig. 22 is a side elevation of an aeroplane showing the parachute being discharged vertically above it, the normal position being shown in dotted lines; Fig. 23 is a front view showing the parachute and apparatus in normal position; Fig. 24 is a detail of a detachable terminal clasp having a tension spring attached; Fig. 25 is a longitudinal section of the releasing device; Fig. 26 is an enlarged section through XXVI—XXVI of Fig. 25; Fig. 27 is a section through line XXVII—XXVII of Fig. 26; Fig. 28 is a side view showing the parachute expanded and attached to an aeroplane, part of the parachute being cut away; Fig. 29 is a bottom plan view of the pneumatic tubing employed to expand the parachute; Fig. 30 is a cross section of the tubing, and Fig. 31 is a section through a friction cable feed mechanism.

Referring now particularly to Figs. 1 and 2, the device consists of a base frame 1 securely mounted upon the flying machine in any suitable manner, having a compartment 2 at the rear for inclosing the firing apparatus to be hereinafter described, and a pair of trunnion brackets 3 projecting vertically above the compartment and on each side of the same, for rotatably carrying the gun mechanism hereinafter described; the base frame is also provided at its front end with an elevated projection 4 which is recessed to afford a mounting for a portion of the releasing mechanism. The sides of the projection extend rearwardly in the form of webs 5 to the heavy front compartment wall 6 for strengthening the whole structure. Upon the base frame is mounted practically the whole apparatus, which comprises a gun barrel 7 provided with a trunnion band 157, having trunnion shafts 9 integral therewith, which shafts have a bearing in the trunnion brackets 3 and permit the gun barrel to be elevated from horizontal to vertical position. A breech block 10 is screwed or otherwise fastened in the rear end of the gun barrel and contains part of the firing mechanism to be later described. The locking head 11 is removably secured about the breech head and also contains a part of the firing mechanism. The projectile for this gun consists of a tubular reservoir 12 fitting snugly within the gun barrel and closed at each end, and is filled with air under sufficient pressure that when suddenly released by the collapsing of the arched closure 179 nearest the breech, or otherwise released, the expansion of the confined air within the projectile against the interior of the gun barrel will propel the projectile and everything attached thereto from the gun and into the atmosphere, with sufficient velocity to accomplish the successive operations which are to be performed by the advancing of the projectile and the momentum stored therein, all of which will hereinafter appear. At the front end of the projectile is securely attached a smaller air reservoir 14, for the storage of air under high pressure, which reservoir has no communication with the main reservoir, but which is for the purpose of supplying air under presssure to a collapsible pneumatic tubular framework attached to the underside of the parachute 15, which is in turn secured firmly to a ring 16 surrounding the outside of the reservoir 14 and secured thereto by means of the clamp ring 17. A thin, light metal tubular casing 18 is provided to screw onto the reservoir 14 at 19, which casing is of slightly larger internal diameter than the outside diameter of the gun barrel and is for the purpose of holding the parachute away from the gun barrel, when the parachute is in folded position about the casing, such as that shown in Fig. 1 and represented by the heavy, irregular black lines. Another shield casing 20, conical in form, is provided at the rear end of the casing 18 and attached securely to the outside thereof to provide a space 21 between the folded parachute and the casing 18 to receive a coil of the main rope 22, and at the same time to provide an elastic retaining means for the main guy rope ring 23 to be hereinafter referred to. The parachute is firmly secured to the ring 16, as well as all the guy ropes which lead down radially along the outside of the parachute, and is folded back and forth along the casing 18, as shown in Fig. 1. An oil paper envelop or cover 24 completely surrounds the folded parachute to protect it from the weather and at the same time serves to hold the folds of the parachute compressed into a minimum amount of space, and prevent its expansion while the projectile is passing through the air until the projectile reaches the predetermined distance from the aeroplane, when the stripping occurs. Where the guy ropes 25 extend beyond the parachute, as at the point 26, they are folded out through the rear end of the paper envelop and then back and forth snugly along the outside of the envelop, where each separate folded guy rope is enveloped by an oil paper flap 27, which is fastened down over the next preceding flap thus forming a separate compartment for each rope, as shown in Figs. 2 and 21, and later to be more fully disclosed.

The free ends of the guy ropes are then secured to the ring 23, this ring being then slipped over the gathered end of the paper cover 24 to hold it securely clamped against the shield 20. Four short strands 28, Figs. 5 and 28, are attached to the ring 23 and connect with the union ring 29; to this latter ring is secured the main rope 22 coiled upon a drum 30 slid upon the casing 18 and held in position by turning it into locking engagement with the pins 31 projecting from the rear end of the casing 18.

By now referring to Fig. 22, it will be seen that the main rope 22 leads from the drum 30 to a spring connection 32 which is detachably secured to the base frame by means of the lugs 33, Figs. 1, 22 and 24, and the spring clasp illustrated in detail in Fig.

24, which comprises the lugs 33 having concave recesses 34 on their opposed inner faces, into which semi-spherical lugs 35 protruding from the legs of the forked spring 36 project making in one, a socket permitting of vertical rotation and a connection that will disengage upon sufficient stress and shock being applied to rope 22 and spring connection 32. The one end of the spring fork 36 is enlarged and a suitable spring 37 is coiled around thereabout, which spring 37 is prevented from overstrain by means of the flexible cable 38, which is secured to the connection members at 39. This cable is slack when the spring is normally in contracted condition, but is drawn taut when the spring is extended to a point near its elastic limit. A rope 40, Fig. 22, is secured to the rope 22 at the point 41, and receives the load of the rope 22 when the clasp 36 pulls away from the lugs 33. The object of this arrangement is to provide a means whereby the rope 22 will draw off from the coil drum 30 on a line substantially parallel to the gun barrel and closely adjacent thereto, so as to facilitate a straight pull in uncoiling the main rope 22 from the drum 30, and to offer a straight pull when the stripping of the parachute is being accomplished. The shock incident to the projectile reaching the end of the rope travel will be observed by the spring connection 32 and when the cable 38 is finally drawn taut, the shock will cause the lugs 35 to compress the legs of the spring fork 36 and thus pull away from the lugs 33. The load assumed by the then expanding parachute will thus be transferred to the rope 40, thence through the four ropes 42 joined at 43, which union is located so as to distribute the full load above approximate center of gravity of the flying machine. The ropes 42 lead through the pulleys 44 secured in the framework of the flying machine, thence down along the main struts 45 through the pulleys 46 and thence to the spring connections 47, which are secured to the main struts at a suitable location, opposite to one another. This construction transfers the load to the base of the machine, which is of course very desirable and provides ample shock absorbing means. The spring connections 47 are of similar construction as that shown in Fig. 24, with the exception that both ends are like the end marked 48.

In normal position the ropes 42 lie flat against the surface of the top plane, as shown in Fig. 23 and are held in position by oil paper fastened over them, which paper tears when the ropes 42 are pulled. They then pass up along the outside of the wind shield 49 and down inside thereof under the parachute where they are arranged so as not to interfere with any of the operating mechanisms. A flexible collapsible wind and protection shield K, Fig. 1, is attached to the rear of the gun barrel and extends over the gun to the base frame and serves to keep out moisture from the working parts.

Referring now to the details of the operating mechanism, and more particularly to Figs. 1, 2, 3, 4 and 5, it will be seen that normally the folded parachute 15, is mounted upon the projectile and the main reservoir 12 thereof is inserted within the gun barrel 7, and that the parachute, projectile and gun barrel lie substantially horizontal above the base frame 1. A pair of tension springs 50, secured at one end to the base frame by the lugs 51, Fig. 1, tends to rotate the gun barrel with the projectile to a substantially vertical position relative to the base frame by means of their attachment at the other end to the crank arms 52, which are keyed to the trunnion shafts 9, but are prevented from so doing by means of the trigger 53 engaging a notch 54 in the lug 55 integral with the wall of the reservoir 14. The gun barrel is also prevented from assuming a vertical position by means of the engagement of the nose 56 on the end of the crank 52 with the pawl 57 which is pivoted at 60 between the two cranks 58 keyed to the shaft 59 traversing the rear end of the device. The pawl 57 is prevented from rotating about the pivot 60 by the nose 61 engaging the under side of the shaft 59. The shaft 59 is held against rotation by the contact of the pawl 62 with the square end 63 of the release rod 64. The plate 65, having roller bearings 66 therein, is provided to prevent friction and binding of the release rod. The shaft 59 is supported by, and takes bearing in the lugs 67 near the ends of the shaft, and the lugs 68 near the center of the shaft. It will now be seen that the gun barrel must remain in horizontal position until both locking means are released, which is accomplished by drawing the release rod 64 forward by the pulling of the cable 69 which passes around the pulley 70 pivoted in a downward projection, at the front of the base frame. This release rod is normally held in the position shown by the compression spring 71 bearing against the end wall 6 of the compartment 2 and the square end of the release rod.

When the square end passes from under the pawl 62 the shaft 59 is free to rotate and the pawl 57 will swing clear of the nose 56 when pressed down by the forward swing of the crank 52 caused by the contraction of the spring 50. This movement however can not occur until the trigger 53 is drawn out of the notch 54, which operation takes place after the square portion 63 of the release rod is clear of the pawl 62, at which time the pins 72, integral with the collar 73 secured to the release rod 64, are drawn into engagement with the forked portion 74 of the trigger 53, which by reason of their contact therewith draw the trigger out of the notch 54 and permit the gun barrel and projectile to rise to a substantially vertical position ready for the firing operation.

The trigger 53, pivoted to the web 5 by the pin 53', is normally held in engagement with the notch 54 by spring 75 secured by the pin 76 to the sides of the front portion of the web 5 of the base frame. To further provide against accidental release of the trigger 53, the cable connection 77 at the end of the release rod 64 is provided with a rearwardly projecting finger 78 which engages the front side of the lower arm of the trigger 53, thus preventing its forward movement unless the release rod is drawn forward by the operator.

It will be seen that by this construction, the gun cannot move to operative position should either the forward or rear locking mechanism become accidentally broken, and that by pulling the release rod 64 forward, it will permit the gun to assume vertical or firing position in the event of failure of either one. In order that the gun with its projectile may be brought down from vertical to horizontal position, it is necessary that the nose 56 on the crank 52 can pass the pawl 57 and that the release rod may pass under the pawl 62, and that the trigger 53 will permit the passage of the lug 55 into its socket at 79. To accomplish these operations the shaft 59 and pawl 62 are held in the positions shown by means of the spring 80 tending to hold the pin 81, secured to the shaft 59, against the lug 82 at the top of the bearing lug 68. Thus the shaft will always come back to the position shown, Fig. 3, and in order that the nose 56 may pass the pawl 57, it is normally held in the position illustrated by means of the spring 83, one end of which passes through the pivot pin 60, which is integral with the pawl 57, and the other end is secured to the outside crank 58, by means of the loop 84, integral with the cranks 58, or otherwise secured thereto. Therefore when the nose 56 comes into contact with the pawl 57, the pawl will be depressed clear of it, and when the nose 56 passes, it will snap back and lock the crank 52, as is shown in Fig. 3.

The trigger 53 clears the lug 55 by means of the cam surface 85, Fig. 4, at the bottom of the lug engaging the top nose 86 of the trigger 53 thereby pushing it aside when the lug 55 is passing, and when it has reached the position shown it will snap into the notch 54. The pin 87 prevents the spring 75 from pulling the trigger beyond the position shown when the lug 55 is not present.

Should the air in the projectile become accidentally discharged while the gun is in horizontal position, the projectile is prevented from being discharged from the gun by means of the contact of the lug 55 with the end of the base frame at 88, the strain being carried by the web 5 and the bottom plate of the base frame.

Referring now to Figs. 3, 5, 11, 12, 13, 14, 15 and 16 the firing mechanism will be considered. Keyed to the trunnion shaft 9 are two gear segments 89 meshing with the two gear segments 90 at each side of the compartment 2. The gear segments 90 are keyed to the operating shaft 91 passing through the compartment 2 and projecting through the sides 92 of the compartment on either side thereof. Upon this shaft are mounted three hammers 93, independent of one another, for operating three independent firing pins to be hereinafter described. It is the object to cock these hammers while the gun is passing from horizontal to vertical position, and to release them against the firing pins when the gun is locked in vertical position with respect to the base frame.

The hammers 93 are mounted for rotation about the shaft 91 and the shaft is mounted in the sides of the compartment for rotation in the bearings 94. The shaft 91 is keyed to cranks 95 adjacent the sides 92, in the ends of which cranks is mounted the shaft 96 which is held against rotation by the pins 97, Figs. 13 and 15. Upon this shaft are rotatably mounted three dogs 98 the upper ends of which engage the notches 99 in the hammers 93, and when the shaft 91 is rotated by the gear segments, the cranks 95, carrying the shaft 96, cause the dogs 98 to revolve about the shaft 91, thereby pulling the hammers 93 around with them. The dogs 98 are held against the notches 99 in the hammers by means of the springs 100 secured at their ends to the shaft 96, while the loop 101 formed by each spring passes over the rear of each dog and tends to thrust them toward the hammers, see Figs. 14 and 15. To hold the hammers in their cocked position the triggers, three in number, 102 are employed. These triggers are mounted for rotation upon a shaft 103, Figs. 3 and 5, and each provided with a nose 104 at the upper end thereof and a long arm 105 extending beneath the shaft 91 at the lower end. When the hammers 93 are rotated through an angle of 90°, or substantially thereabout, by the dogs 98, the nose 104 on each trigger is shoved into the notches 106 by springs 108, and the cam surface 107 on the lower arms of the dogs 98 come into engagement with the shaft 103, thereby causing the nose 154 of each of them to be withdrawn from the notches 99 in the hammers 93 shortly after the nose 104 of each trigger 102 falls into the notch 106 in the hammer.

Three sleeves 108 are mounted upon the shaft 91 for rotation, one beside each hammer on the same relative side, Figs. 3, 5, 11 and 12. These sleeves are constructed as in Fig. 12 with a solid portion 109, a flange 110, formed by the portion 111 having been cut away to form a socket 112 to receive the main spring, and an abutment surface 113 to impinge upon a stop lug and a driving lug to be referred to later. The main hammer springs 114, one for each hammer, are socketed in the end plate 114' of the compartment 2 at 115, and extend into the socket 112. When the hammers are drawn back by the dogs 98 engaging the notches 99, the lug 116 on the side of each hammer engages the abutment surface 113 of each sleeve 108 and causes each sleeve to rotate with the hammer adjacent to it, thus causing each main spring 114 to bow upward. When the nose 104 of each trigger 102 is drawn out from the notch 106 in each hammer, the main spring 114 drives the sleeve back to its original position by means of its contact with the lug 116 on the side of the hammer. The sleeve 108 is stopped in the position shown in Fig. 3 by the abutment surface 113 coming in contact with the downwardly projecting lug 117 on the under side of the top plate 118 inclosing the firing apparatus.

Each hammer 93 does not stop at the position shown in Fig. 3, however, but swings on through the opening 119 in the top plate 118, until the nose 120 of the hammer strikes the firing pin which is directly above the opening in the top plate when this operation occurs. Each hammer is caused then to return to the position shown in Fig. 3 by means of the spring 121, Fig. 11, which is coiled about the shaft 91 and lies within the recess 122 in each hammer. One end of this spring is fastened to the hammer at 123 and the other end is secured to the sleeve 108 by means of bending it through the hole 124, Fig. 12. Spring 121 is so wound about the shaft 91 that when the nose of the hammer moves up through the opening 119 in the top plate, it winds the spring and then recoils back to the position shown in Fig. 3 by the unwinding thereof.

It will thus be seen that the hammer nose 120 normally remains below the top plate 118 except when striking the firing pin.

By referring to Fig. 3 it will be seen that the lug 116 is so located on the hammer 93 that it clears the downwardly projecting lug 117 on the under side of the top plate 118, and that in the position shown the lug 116 is bearing against the abutment surface or face 113, by reason of the spring 121, and that the abutment surface 113 is in turn bearing against the lug 117 caused by the tension of the main spring 114.

In order that all parts may be readily assembled between the two fixed side walls 92 and the auxiliary side plates 125, the shaft 91 is provided with a key way throughout its entire length. The cranks 95 are keyed to this shaft by means of the keys 127, the reduced ends 128 of which extend through the bearings in the side plates 92 and 125. The parts can thus be put on the shaft in their order as the shaft is thrust through the bearing 129 toward the opposite bearing.

The side plates 125 are provided to carry the trigger shaft 103. A dog 130, Fig. 3, is pivoted to each of the triggers 102 at the lower end 105 and extends upward into lost motion engagement with the locking finger 131 mounted for rotation upon the shaft 131', and normally held in the position shown in Fig. 3 by means of the spring 132. This locking finger 131 is provided with an upward projection 133 which normally extends above the top plate 118, as shown in Fig. 3, and is for the purpose of engaging the notch 144 provided in each of the webs 135 in the locking head 11, when the locking head swings down into engagement with the sides 92 of the compartment 2, which project slightly above the top plate 118 as at 136.

At the end of the locking finger 131 is an offset portion 145 forming a seat upon which the nose 146 of the dog 130 normally rests; the dog 130 being held in contact with the locking finger by the spring 147.

Referring now to Figs. 3 and 5, the locking head 11 is mounted upon the breech of the gun 7 and is for the purpose of providing a suitable positive connection and locking means between the gun and the base frame, and at the same time to carry part of the firing apparatus, viz; the firing pins.

This locking head 11 is held against rotation about the axis of the gun by means of the mechanism to be herein disclosed, and it is the object to so connect the locking head with the main frame that it will be held at all times against rotation about the axis of the gun regardless of the position of the latter. To accomplish these functions the locking head is provided with a series of webs 135, four in number, integral therewith, which extend around underneath the head when the gun is in horizontal position, Fig. 3, and each is provided with a cam surface 149 and a notch 144 near the firing pins 148. These webs mesh between a series of lugs 150 lying between the side walls 92 and cast integral with the base frame.

The side walls 92 extend down to the base of the base frame and, together with the end wall 6, are integral with the base frame. Near the end wall 6, the side walls are curved upward with a radius struck from the center of the trunnion upon which the gun rotates. At the sides of the locking head 11 are two webs 151 which extend from the top to the bottom thereof, each having one end cut down with the same radius employed in the side walls 92 and 136; consequently when the head is swung around to the vertical position the webs 151 will exactly abut the top edges of the side walls 92 causing the recoil to be absorbed upon the base frame eliminating any strain on the brackets 3.

When the locking head is swung around from horizontal to vertical position, the webs 135 slide snugly between the lugs 150 and thus guide the locking head and webs 151 thereon accurately to positive contact with the side walls 92; the square ends of the webs 151 causing the gun to stop exactly in the vertical position relative to the base by reason of their contact with the side walls 92 after the gun has rotated through substantially 90°.

When the locking head is in this vertical position, each firing pin 148 will be directly over the opening in the top plate 118 and directly in the line of the nose of each hammer 93. The locking fingers 131 can then slip into the notches 144 in the webs 135 and thus lock the gun in a substantially vertical position relative to the base. Upon the locking finger shaft 131' are securely mounted four screws 152 which engage a pin 153 on the side of and integral with each locking finger. A manually operable crank arm 131² is attached to one end of the shaft 131' at the exterior of the side wall 92 and is for rotating the shaft in the direction of the arrow, when it is desired to release the locking finger from the notches 144, so that the gun may be brought back to the horizontal position after firing.

Assuming now that the gun is in horizontal position and released so that it may swing to the vertical position, the operation of the firing apparatus, is as follows, attention being directed to Fig. 3. The instant the gun starts to rotate on the trunnions 9, the shaft 91 is rotated by the gear segments 89 and 90 keyed to the shafts 9 and 91 respectively, and thus causes the shaft 96 mounted on the crank arm 95 to revolve about the shaft 91, carrying with it the dog 98, which in turn causes the hammers to rotate on the shaft 91; the hammers causing the sleeves 108 to rotate about the shaft 91 through the contact of the lug 106 with the abutment surface 113 on the sleeve. About the same time, the cam surface 149 on each web 135 comes into engagement with the projection 133 on each locking finger 131 and when the gun has rotated through about 20° the locking fingers are depressed to the level of the top edge 136 of the side walls 92, but bear against the edge of the webs 135 held in contact thereto by the springs 132. When the locking fingers are depressed, the operation leaves the nose 104 of each trigger 102 free to be pressed against the rear circular portion of the hammer 93 and into the notches 106, when it comes around to that point, because the dog 130 can drop slightly owing to the space then existing between the nose 146 of the dog 130 and the seat 145 in the end of the locking finger.

As the gun further rotates, each hammer is rotated until the notch 106 comes opposite to nose 104 of each trigger 102, when the nose will fall into the notch and the dog 130 will be pulled downward a slight distance further. However, there will still be lost motion between the dog 130 and the locking finger seat 145.

Just previous to the notch coming opposite to nose 104, the cam surface 107 of each dog 98 comes in contact with the shaft 103 and begins to pull the nose 146 on the opposite end of the dogs 98 out of the notch 99 in the hammer, but does not pull it clear of the notch until the nose 104 of the trigger falls into the notch 106 which operation causes the hammers to remain in the cocked position. Thus the hammers are cocked when the gun has rotated through an angle of about 70°, and as there is nothing to interfere with the further travel of the dogs 98, the lost motion requisite to the cocking of the hammers is provided.

The hammers remain in cocked position until the webs 151 come in contact with the side walls 92 at which time the gun is in vertical position relative to the base frame, and the locking fingers 131 may slip into the notches 144 in the webs 135, which have now come to the position permitting them to do so.

The space between the nose 146 on the upper end of each dog 130, and the seat 145 at the end of each locking finger is so adjusted that when the locking finger has almost attained its final position, the seat 145 comes in contact with the nose 146 and raises the dog 130 sufficiently to pull the long arm of the trigger 102 upward causing the nose 104 to pull away from the hammer notches 106 thus releasing them.

The spring 114 then shoves the sleeve 108 around, carrying the hammer with it, until the abutment surface 113 on the sleeve 108 comes in contact with the downwardly projecting lug 117 on the top plate 118, where it stops abruptly. The hammer travels on by the force of its momentum, the nose projecting through the opening 119 in the top plate 118 and striking the firing pin a sharp blow after which it retracts to the position shown by the action of the spring 121, Fig. 11.

Referring now to Figs. 3, 6, 7, 8, 9 and 10, the breech mechanism will be considered. The gun barrel 7 is enlarged slightly at the breech, as at 155. This enlarged portion is undercut at 156 to receive the ring 157 which is integral with the trunnion shafts 9. The trunnion shafts are squared at 158 adjacent the ring 157 and the enlarged head is cut away at 159 to receive the square portion of the shafts. This furnishes an effective means for holding the trunnion shaft and ring against rotation on the gun barrel, and at the same time reinforces the band 157. This band 157 is slid on the rear end of the gun barrel 7 and held thereon by means of a two-piece ring 160, spliced similar to the ring shown in Figs. 9 and 10. This ring is fitted in the annular groove 161 cut in the outside of the barrel.

A breech block 10 is screwed, or otherwise securely adjusted, to the end of the barrel 7, which has three cartridge compartments 161, Figs. 3 and 6, for the insertion of three steel nosed rifle cartridges 162, the two side compartments converging slightly toward one another. At the smaller end of each compartment is screwed a barrel 163 through which the steel nosed rifle balls pass. The breech block is held against rotation and in the position shown by means of the screw plugs 164, passing through the barrel 7 into the thick portion of the breech. The head locking ring 165, Figs. 3, 6, 9 and 10, fits into the annular recess 166 near the rear end of the breech block 10 and is made in two pieces as shown in Figs. 9 and 10 and locked together by the screws 167. This ring has four notches 168 cut to the depth that brings the diameter at the notch portion equal to the largest diameter of the breech block 10. This construction causes the projecting portions 169 to extend radially out beyond the breech head when the ring is adjusted in the annular groove 166.

The pivoted handle 170 is mounted in one of the projections 169, as shown in Figs. 9 and 10 for the purpose of shifting the ring in the groove when it is desired to lock the locking head on to the breech block against endwise removal.

The locking head has four lugs 171 projecting inwardly from the interior walls of the same, of slightly shorter length than the notches 168 in the ring 165.

When it is desired to put the locking head upon the gun, the webs 135 are positioned so that they will slide between the lugs 150 on the base frame; the locking ring 165 is adjusted so that projecting lugs 171 in the locking head will pass the notches in the ring; the locking head is then shoved forward over the breech. It will be necessary to lay the handle 170 on the ring 165 down forwardly flat against the outside of the breech and barrel while this is being done.

When the locking head is shoved home, the handle 170 will register with the offset slot 172, Fig. 8, in the locking head. A sharp instrument is then inserted into the slot and the end of the handle picked out, and moved through the main slot 173 carrying the ring around with it until the handle registers with the opposite slot 174, when it is pressed down forwardly into this latter slot, thereby locking the ring against rotation. The lugs 171 are now in engagement with the projections 169 on the ring 165, thereby locking the locking head to the breech against endwise removal. The firing pins 148 in the locking head now register with the cartridges 162 in the breech block.

That the locking head may be secured against rotation on the gun two notches 175 are cut in the end of the shell of the locking head, Figs. 3, 6 and 7, which engage the square portion 158 of the trunnion shaft 9, in a manner similar to the method employed in locking the band 157 to the gun; the locking head extending a short distance over the band, and covering a portion thereof.

It will be seen that this construction securely locks all parts and holds them against rotation about the axis of the gun.

Referring now to Fig. 3, the means employed for releasing the compressed air in the reservoir 12, which is the main body of the projectile, will be considered. To confine the compressed air in the reservoir 12 at the end near the breech, a seat block 176 is screwed into the end of the cylinder comprising the projectile 12, in which an annular recess 177 is formed; this recess is lined with adhesive, elastic substance 178 and a semispherical closure 179 preferably made of glass or other friable material, which is not porous, or if made of a porous substance is lined on the convex side with a permanently air tight non-porous substance, seated therein. An elastic adhesive seal 180 is then deposited at the point of union of the convex surface and the inside surface of the seat block 176. With such a closure, the arch of the semispherical crown makes it possible for a comparatively thin piece of friable material to be used, and the elasticity of the seal prevents the expansion and contraction of the material employed from exerting unequal side strains on the closure 179, which might tend to cause a fault in the arch, and the consequent collapse due to the high pressure bearing against it.

By this means of construction a perfectly air tight closure is provided and at the same time the closure is such that a full opening is effected instantly, an opening which is the full area of the inside opening of the seal block, which is little less than the internal diameter of the cylinder 12. This instantaneous opening is accomplished by the sudden collapse and crumbling of the semi-spherical arch after the same has been cracked or pierced by the simultaneous discharge of the cartridge balls from the cartridges 162 in the breech block. Each ball takes effect upon the closure near its center and in a row causing the sudden rupture of the arch.

A vent 181 leads through the breech block and locking head into the atmosphere to relieve the pressure in the chamber 182' between the breech block and the arched closure when the cartridges are discharged. This vent is not of sufficient size to materially effect the pressure in the gun when the compressed air is released. An alarm whistle 181' is secured in the vent outside the locking head to give a warning should the closure for some reason leak.

A metal packing ring 182 is mounted in the rear end of the seat block 176 so that the projectile receives the full benefit of the pressure behind it, and the outside of the cylinder is covered tightly with some tough fabric which is pressed into rifling grooves, not shown, provided in the gun barrel 7.

As there are three hammers 93 each operated independently of the other, three firing pins and three cartridges any one of which will fracture the closure, the failure of any two of the parts named, would not prevent the successful operation of the device. This is considered a very necessary precaution and wherever it is possible, two or more of the same operating devices are employed, and are of such construction that the failure of one will not obstruct the operation of the others.

Referring now to Fig. 4, the front end of the projectile containing the smaller compressed air chamber and valve mechanism will be considered. Here the front end of the projectile 12 is shown having a closure 183 screwed into the end. This closure is semi-spherical and contains the charging valve 184 provided with a spring held valve 185 and a screw cap 186. A pressure gage 187 is also secured to the head and communicates with the interior of the reservoir at 188. This closure has a ground joint contact at 189 with the cylinder 12, affording an effective air tight connection. To the exterior of the cylinder 12, the small secondary reservoir 14 is screwed securely, thus joining the two members. The purpose of this reservoir is to hold a supply of air under high pressure to inflate the pneumatic tubular framework secured to the under side of the parachute to facilitate the quick expansion of that member at a comparatively low falling velocity. This reservoir is provided with a pressure gage 14' secured to the exterior of the casing and communicating with the interior for determining the pressure at all times.
The radial tubes of this pneumatic framework are securely connected to the ports 190 radially extending from the chamber 191, which is separated from the reservoir 14 by the convex partition 192. Reservoir 14 communicates with the chamber 192 through the valve port 193, the area of which is equal to the combined area of the radial tube connecting ports 190. This valve port 193 is held normally closed by the valve 194 bearing upon the seat 195, and is held there by the compression spring 196 bearing against the spider 197 secured to the end of the cylinder 198, directly in line with the valve and stem 199. To this stem is attached the piston 200 provided with packing rings 201 and a spring closed valve 202, stopping a passage 203 extending through the piston. The cylinder 198 is screwed to the mouth 204 of the reservoir 14, and the charging valve 205 and the pilot valve 206 are mounted in the head 207 thereof. The pilot valve consists of a glass tube 207' closed at one end, securely mounted in a nut secured in the head of the cylinder 198, and so packed that it will make a perfectly air tight closure. On the closed end of the glass tube, is mounted an I-thimble 208 to which a strong non-corrosive metal cable 209 is attached, which leads down through the paper envelop and is attached to one of the folds of the parachute which lie near the front of the projectile when folded. When the parachute is stripped down over the projectile to this fold the cable 209 will be jerked, causing the glass tube 207 to break off, and the broken part of the thimble 208 to pull out through the opening 210 which is provided for that purpose in the cap 211 and to allow the air on the front side of the piston 200 to escape. The area of the piston 200 being greater than the area of the valve port 193, the valve 194 is raised instantly and allows the air in the reservoir 14 to pass into the chamber 191, and thence into the radial tubes attached to the under side of the parachute.

Paying particular attention now to the method employed in folding the parachute about the projectile, the pneumatic expanding means, the manner in which the guys, or guy ropes, are stored to prevent tangling and the means employed in ripping open the oiled paper parachute cover when the guy ropes are all pulled out, reference will be had to Figs. 17, 18, 19, 20, 21, 28, 29 and 30.
In Fig. 17 the folding of the parachute is represented diagrammatically by the irregular black lines 15 and the paper cover 24, by the regular black lines. Two of the guy ropes designated by 25' on opposite sides of the folded parachute are folded in a slightly different manner than the balance of the guy ropes 25, because they are so arranged that when they have pulled out to the next to the last fold they must tear down through the paper envelop 24 before pulling taut thus dividing the paper cover 24 into halves permitting the free stripping of the parachute over the rear end of the projectile 12. This is accomplished by having the guy ropes 25' pass once up under the paper cover and out through the same at 24" and thence folded up and down in the manner diagrammatically shown in Fig. 20. After passing out through the paper envelop at

24″ the folding is just the same as the folding for the balance of the guy ropes.

Fig. 18 shows an outside view of the parachute in folded position and inclosed in the paper envelop 24, the dotted lines representing one of the guy ropes 25 folded underneath the flaps 27, such flaps extending almost to the front end of the projectile from the point 27′ at the rear, and the method of overlapping the flaps 27 is illustrated in Fig. 21, which shows the separate compartments formed by the flaps and the ends of the folds of the guy rope contained therein. Each flap 27 folds over the next preceding one and is cemented to the outside thereof, with the exception of the compartments A containing the guy ropes 25′, in which case the flap B is pasted under the next adjacent flap forming the compartment A, as at C, this being done so that the rope 25′ in tearing through the envelop 24 will separate the envelop into halves, which would not be the case were the flap B pasted in the same way as the balance, as the flap B would not be torn and would still hold the folds of the parachute in confinement. After the guy ropes are folded and placed in their respective compartments, the protruding ends are secured to the ring 23 which is then slipped over the gathered end of the paper envelop and forced onto the concave annular elastic flange 20′ at the end of the conical shield cylinder 20. This arrangement serves to hold the gathered end of the paper envelop securely about the folded parachute at the rear, and furnishes a convenient detachable mounting for the guy rope ring 23. The annular flange is made elastic by means of the cut out portions 20″. This permits of the compression of the flange to allow the ring 23 to be pulled off when the end of the rope 22 is reached by the flying projectile.

Parachute 15 is of sufficient size to retard the descent of an aeroplane to a safe landing velocity, but where it is not desired to carry one of such dimensions, as possibly in the case of a racing machine, a smaller parachute may be used to retard the descent sufficiently to allow time for the aviator to swing clear of the falling machine by means of an auxiliary rope secured to the main parachute rope and then cut the machine free allowing it to fall, while he is lowered by the parachute. The parachute is made of a light tough silk, woven with heavy strands running at right angles to each other spaced about one inch apart, and is oiled or otherwise treated to make it comparatively air tight; the heavy strands preventing the elongation of any rips that may start in the fabric. To further guard against extensive ripping a light network made of strong silk strands having a mesh of not over three or four inches completely covers the parachute and is tacked to the fabric at short intervals; the net is also firmly secured to the guy ropes leading radially over the parachute and is put beneath them, lying between the parachute fabric and the guy ropes. It will thus be seen that the strain upon the under surface of the fabric will be distributed about the tough silk network. The cross bar weave and net work above referred to are not illustrated in the drawings to avoid confusion in lines.

To positively expand the parachute, a collapsible tubular framework 210 is secured to the under side of the parachute, Figs. 28, 29 and 30, having radial tubes 211 leading from the chamber 191 in the projectile head, and extending to the continuous ring 212 encircling the parachute near its periphery. Near the point of connection between the radial tubes and the circular tube, the radial tubes branch as at 213 so as to communicate with the circular tube at both sides of the point 214, should a kink occur in the circular tube at that point, due possibly to the initial depression of the parachute by a guy rope at that location when the parachute is opening.

The tubing is constructed of fine rubber material such as is commonly used for inner tire tubes, but of a finer and thinner quality so as to reduce its bulk and weight. To increase the life of this tubing, it is lined on the inside with fine silk to prevent the rubber surfaces from coming in contact when the parachute is folded. A tough heavy silk casing is provided for the outside, capable of holding the rubber tubing in confinement at pressure substantially above 50 pounds per square inch, as such a pressure will exist throughout the framework when the air in the reservoir 14 is released into this framework.

As the air is released into the tubing directly before the parachute is stripped, it follows that when the parachute is entirely stripped over the projectile and is drawn out to its full closed length the compressed air will already have traversed the radial tubes and will charge the circular tube 212 directly afterward causing the periphery of the parachute to assume a large expanding circle, assisted of course by the pressure incident the fall of the parachute through the air.

It is a well known fact that the parachute in common use today must travel downward at a comparatively high velocity before sufficient pressure can accumulate within it to stretch out the parachute and that the higher the falling velocity required to expand the parachute, the greater will be the strain upon the fabric of the parachute when it first opens. In a parachute of the dimensions here considered, and with the comparatively heavy weight which is to be lowered safely, it is quite obvious that means should be provided to aid the expansion of the parachute materially before a high falling velocity is attained thus minimizing the strain and shock.

The expansion of the circular tube 212 the instant the parachute is drawn out straight immediately starts the periphery of the parachute to spread out before the strain of the guy ropes is appreciable, the tendency thus being to pull the center of the parachute toward the plane of expansion of the periphery. The parachute will thus be partially open, or opening, at a rate of falling speed which is comparatively low with respect to the rate requisite to open a parachute of ordinary construction. The result of this will be that the parachute will open entirely at a much lower rate of falling speed than usually requisite, and therefore with far less incident shock and strain. In order to secure a maximum of wind resisting area for the amount of material employed, the parachute may be provided with a continuous annular flap 215 forming a pocket around the periphery of the parachute, as shown in Fig. 28. The periphery of this pocket is supported by ropes 217 extending toward the center of the parachute and tied to the under side thereof at 218 by passing through the parachute fabric and secured to the guy ropes 25 leading down the outside thereof.

The air pressure on the inside of the parachute in the direction of the arrows is greater than the pressure from beneath at the periphery of the parachute, and the continuous pocket will therefore bulge as shown, causing the guy ropes to be shoved away from the center of the parachute at the point of contact therewith, thereby increasing the effective area to a considerable extent.

Referring to Figs. 22, 23, 25, 26 and 27, the release handle will be considered. This device consists of a casing 219 expanded into a bell 220 and mounted at a convenient location on the flying machine accessible to the operator. The handle 221 normally held in the position shown by the springs 222 is secured to the end of a rod 223 which slides in the bearings 224 and 225. The shaft 223 has an enlarged portion 226 in which is cut a slot 227 transversely of the axis, the sides of the slot being cut at an angle with the axis equal to the normal inclination angle of the casing 219 relative to the flying machine. This slot normally registers with a well 228 in the bearing block 225 cut at the same angle with relation thereto as is the slot 227. The depth of the slot at the point 229, Fig. 26, is slightly greater than the radius of the ball 230 which normally rests at the bottom of the well 228 and moves freely therein. It will be thus seen that the rod 223 can be pulled toward the operator while the ball remains in the well, but when it rolls down into the notch 227 by the turning over of the flying machine in any direction for more than 90°, the sides of the slot 227 press the ball 230, which will assume the position indicated in dotted lines, Fig. 27, against the wall of the well 228 at the point marked 231, and bind it there by reason of the depth of the slot 227 being greater than the radius of the ball. The shaft is therefore locked and cannot be pulled by the operator. While thus locked it may however be released should it be so desired, by rotating the shaft in either direction, causing the cam surfaces 232 of the bottom of the slot 227 to force the center of the ball beyond the point 231 and into the well, thus allowing the rod to slide in its bearings, the ball being shoved completely into the well regardless of the inclination of the latter with respect to the horizontal.

The handle 221 is normally held against the bearing block 224 by means of the compression spring 233 abutting the bearing block 225 and the I-head 234 secured to the opposite end of the shaft. The operating cable 69 is secured to the I-head thus coupling the handle 221 to the release rod 64. By the above construction the operator is prevented from discharging at an angle below the horizontal, where it would be the least effective, but if it is seen that the machine will not turn over to an effective firing position, the projectile may still be discharged by turning the handle in either direction until the rod is unlocked, when it may be pulled by the operator.

When the projectile is released it is quite obvious that the engine should be stopped, and for this purpose a cut out switch in the ignition system, operated by the release rod, is provided. The circuit is held closed by the contact of the metal sleeve 223' with the spring terminals 219' and is opened when the release rod 223 is pulled, causing the sleeve 223' to pass out of engagement with the terminals. To prevent the rod from returning to its normal position, the spring 222' is provided in the rod 223 and is depressed into the groove 220' when the handle is pulled forward. When the end of the spring passes the bearing 224 the spring 222' engages the bearing and prevents the return of the rod thus holding the circuit open.

Having fully described the construction of the apparatus the operation thereof will now be discussed. Assuming that the main reservoir 12 has been charged with air under sufficient pressure to discharge the projectile from the gun at sufficient velocity to carry it the required distance from the flying machine, and that the reservoir 14 has been charged with air under high compression, and that the parachute, guy ropes, and main rope have been properly folded and positioned as described, the main reservoir 12 is slipped into the gun barrel 7 while the folded parachute remains without and surrounds the gunbarrel. The gun barrel is then lowered to the horizontal position and the release rod allowed to lock it in that position by the double locking means described.

The apparatus is now ready for firing when the emergency arises. Assuming now that the flying machine, when at considerable elevation is disabled, or that the operator has lost control thereof so that a fall is inevitable, the operator, who should preferably be strapped to his seat, immediately braces himself and pulls the handle controlling the release rod. The springs 50 acting upon the cranks 52 cause the gun barrel with the projectile to swing up to the position vertical to the base, the three hammers 93 being simultaneously cocked by this movement of the gun barrel, and when the latter has finally reached vertical position, it is locked in place. The following instant the triggers are pulled by the locking mechanism when the hammers are caused to strike the firing pins, which in turn impinge upon the percussion caps in the cartridges contained in the breech block, and the steel nosed balls are driven through the friable diaphragm or closure 179 in the end of the main reservoir.

The pressure in the reservoir immediately crushes what may remain of the closure and rushes against the breech block, the reaction discharging the reservoir projectile with the parachute attached thereto nose forward into the atmosphere with sufficient velocity to carry it clear of the flying machine and to accomplish the objects to be enumerated and hereinbefore described.

The main rope 22 immediately pulls the spring 32, Fig. 22, up along side of the gun barrel and then starts to slip off from the drum 30, where it was previously coiled. This rope is about equal to the distance between the center of the flying machine and the tip of one of the planes. When the end of the rope 22 is reached by the projectile, the four strands 28, connecting the rope 22 with the guy rope ring 23, jerk the ring from the concave flange of the shield cylinder 20, thus freeing the end of the paper envelop surrounding the parachute, and pulling out the guy ropes from their respective compartments formed on the exterior of the parachute envelop. The momentum stored in the flying projectile causes it to continue its flight until the guy ropes are all pulled out from their compartments, and the two guy ropes 25' have torn the envelop into halves, and until the folded parachute has been stripped over the projectile, there being sufficient momentum to accomplish all of these operations. The pressure in the air reservoir 12 should be regulated so as not to give more velocity to the projectile than is required to complete the stripping operation so as to avoid excessive shock when its forward movement is finally retarded. The spring 32 is provided to absorb any excessive shock of this nature. When the parachute is stripped to its full length the compressed air in the secondary reservoir 14 has already been released by the breaking of the frangible pilot valve closure 207' by the cable 209 which is attached to one of the folds of the parachute, as has been heretofore described.

The pneumatic tubular framework is caused to expand immediately causing the parachute to expand at its periphery and subsequently to open to full diameter.

As the complete operation requires but a few seconds from the time the release rod is pulled, it will be seen that the falling machine cannot acquire a very high velocity in that short interval owing to the resistance afforded by the planes. The shock incident to the opening of the parachute and its assumption of the load of the falling machine, pulls the spring clamp 36 away from the lugs 33 at the base of the gun and transfers the load to the rope 40 which is attached to the spring suspension system previously described.

A friction feed, Fig. 31, for the cable 40 is provided to allow the load on the parachute to be gradually applied, and consists of a pair of disks 40' keyed against rotation upon a screw shaft 22'. The cable is wound spirally between the disks which may slide toward one another on the shaft, and is fastened to the hub portion of one of the disks. The cable is thus divided into two parts, one part being fastened to the hub portion of one of the disks and the other part to the framework of the reel. The ends of the shaft are threaded oppositely, one end having a right-hand thread and the other end, a left-hand thread. Nuts 23' are mounted on the ends of the shaft and springs 24' are arranged between the nuts and the disks 10' which abut the disks 40'. Toggle arms 30' connect the nuts, and a fastening yoke 29' for the lower end of the cable is provided at the hinge of the toggle arms. When the upper cable 40 is pulled, the disks rotate the shaft 22' which action causes the nuts to move toward each other thus tightening the springs and increasing the friction on the cable as it draws out from between the disks, causing a gradually increasing resistance as the cable unwinds.

All excessive shock is thus absorbed and the load gradually transferred to the parachute relieving it of excessive initial strain.

It is quite obvious that the gun may be constructed to discharge the projectile at any desired angle relative to the plane surfaces of the machine it being merely a matter of design and construction to have it so discharge, and I do not limit this invention to the angle herein illustrated as preferable. It is quite evident also that this apparatus may be made applicable to the monoplane type of aeroplane by arranging a suitable mounting over the engine and in front of and above the operator, the spring ropes being so located as to distribute the load near the base of the machine substantially above the center of gravity, in much the same manner as employed in the bi-plane construction herein illustrated. It will be equally obvious that a propelling agent for the projectile other than the one disclosed may be utilized without departing from the spirit of my invention, and it will be understood that the term firing as used in the claims covers the discharge of the compressed air or other propelling agent utilized in projecting the projectile and its parachute, clear of the machine.

The advantages of the apparatus herein set forth together with such others as may be incident thereto, will be apparent to those skilled in flying apparatus. It will be clear that the fastening cable of the parachute may be attached either to the aeroplane, or to the operator.

Having thus described my invention and illustrated its use what I claim as new and desire to secure by Letters Patent is the following:—

1. A safety device for aeroplanes comprising a projectile, a folded parachute secured thereto, a fastening cable for the parachute, means mounted on the aeroplane structure for projecting the projectile and the parachute in folded position thereabout clear of the aeroplane, and means opening the parachute after it has traveled in folded condition a predetermined distance.

2. A safety device for aeroplanes comprising a projectile, a parachute secured thereto and folded thereabout in concentric folds, a fastening cable for the parachute, and means mounted on the aeroplane structure for projecting the projectile and parachute clear of the aeroplane, the said cable being adapted to strip the folds of the parachute over the projectile.

3. A safety device for aeroplanes comprising a projectile, a folded parachute secured thereto, a cable for fastening the parachute to the aeroplane, and a gun mechanism for projecting the projectile clear of the aeroplane, said gun mechanism when in inoperative position lying substantially parallel to the plane of flight and when in operative position at an angle with respect to said plane.

4. A safety device for aeroplanes comprising a projectile, a folded parachute secured thereto, a cable for fastening the parachute to the aeroplane and a movable gun mechanism for projecting the projectile and parachute clear of the aeroplane, the said gun mechanism lying normally substantially parallel to the planes when in inoperative position and at a substantial angle thereto when in operative position.

5. A safety device for aeroplanes comprising in combination a gun mechanism, a projectile mounted therein, a parachute secured thereto and folded about the gun mechanism in radial and concentric folds, and a cable for fastening the parachute to the aeroplane, the said gun mechanism being adapted to project the projectile clear of the aeroplane.

6. A safety device for aeroplanes comprising in combination a gun mechanism, a projectile mounted therein, a parachute secured to the projectile and folded about the gun mechanism, a casing between the gun mechanism and the folded parachute, and a cable for fastening the parachute to the aeroplane, the said casing permitting the parachute to strip freely from the gun mechanism when the latter discharges the projectile clear of the aeroplane.

7. A safety device for aeroplanes comprising in combination a gun mechanism, a projectile mounted therein, a casing fitting loosely over the gun mechanism and secured to the projectile, a parachute secured to the projectile and folded about the said casing, and a cable for fastening the parachute to the aeroplane, the said gun mechanism being adapted to discharge the projectile clear of the aeroplane.

8. A safety device for aeroplanes comprising in combination a gun mechanism hinged to the aeroplane structure, a projectile mounted therein, a folded parachute secured to the projectile, and a cable for fastening the parachute to the aeroplane, the said gun mechanism when in inoperative position lying substantially parallel to the plane of the aeroplane, and when in operative position at a substantial angle thereto so that the projectile will be discharged clear of the aeroplane.

9. A safety device for aeroplanes comprising in combination, a gun mechanism hinged to the aeroplane and normally lying substantially parallel to the plane thereof, a projectile mounted therein, a folded parachute secured to the projectile, a cable for fastening the parachute to the aeroplane, and means for moving the gun mechanism to a position at a substantial angle to the planes so that the projectile will be discharged clear of the aeroplane.

10. A safety device for aeroplanes comprising in combination, a gun mechanism hinged to the aeroplane normally lying in a substantially horizontal position, a projectile mounted in the gun mechanism, a folded parachute secured to the projectile, a cable for fastening the parachute to the aeroplane and means for moving the gun mechanism to a position substantially vertical.

11. A safety device for aeroplanes comprising in combination a gun mechanism hinged to the aeroplane normally lying in a substantially horizontal plane, a projectile mounted in the gun mechanism, a folded parachute secured to the projectile, a cable for fastening the parachute to the aeroplane, means for moving the gun mechanism to substantially vertical position, and means for locking the gun mechanism in such position.

12. A safety device for aeroplanes comprising in combination a gun mechanism hinged to the aeroplane normally lying in a substantially horizontal plane, a projectile mounted in the gun mechanism, a folded parachute secured to the projectile, a cable for fastening the parachute to the aeroplane, means for moving the gun mechanism to substantially vertical position, and means for automatically locking the gun mechanism in such position.

13. A safety device for aeroplanes comprising in combination, a gun mechanism hinged to the aeroplane normally lying in a substantially horizontal plane, a projectile mounted in the gun mechanism, a folded parachute secured to the projectile, a cable for fastening the parachute to the aeroplane, means for moving the gun mechanism to a substantially vertical position, and a firing or discharging mechanism for the gun mechanism actuated when the gun mechanism is brought to a substantially vertical position.

14. A safety device for aeroplanes comprising in combination, a gun mechanism hinged to the aeroplane normally lying in a substantially horizontal plane, a projectile mounted in the gun mechanism, a folded parachute secured to the projectile, a cable for fastening the parachute to the aeroplane, means for moving the gun to a substantially vertical position, means for locking the gun mechanism in such vertical position, and a firing or discharging mechanism operated by the gun mechanism when the latter is brought to the said vertical position.

15. A safety device for aeroplanes comprising in combination a gun mechanism hinged to the aeroplane normally lying in a substantially horizontal plane, a projectile mounted in the gun mechanism, a folded parachute secured to the projectile, a cable for fastening the parachute to the aeroplane, means for moving the gun mechanism to a substantially vertical position, and a locking and firing mechanism for locking the gun mechanism when brought to said vertical position and immediately firing it.

16. A safety device for aeroplanes comprising in combination a gun mechanism mounted on the aeroplane, a hollow projectile mounted therein having a self-contained propelling agent, a parachute secured to the projectile folded about the gun mechanism, and means for firing the propelling agent.

17. A safety device for aeroplanes comprising in combination a gun mechanism mounted on the aeroplane, a hollow projectile for the gun mechanism, a folded parachute secured to the projectile, an expansible propelling agent in the projectile, a frangible closure for the projectile, and mechanism to break the frangible closure and release the propelling agent.

18. A safety device for aeroplanes comprising in combination a gun mechanism mounted on the aeroplane, a hollow projectile for the gun mechanism, a folded parachute secured to the projectile, an expansible propelling agent within the projectile, a friable closure for the projectile, and means adapted to break the friable closure and release the propelling agent.

19. A safety device for aeroplanes comprising in combination a gun mechanism mounted on the aeroplane, a hollow projectile for the gun mechanism, a folded parachute secured to the projectile, an expansible propelling agent within the projectile, and means for releasing the said propelling agent.

20. A safety device for aeroplanes comprising in combination a gun mechanism, a hollow projectile therefor, a charge of compressed air in the projectile, a friable closure for the projectile, a folded parachute secured to the projectile, means for breaking the closure to release the compressed air, and a cable for fastening the parachute to the aeroplane.

21. A safety device for aeroplanes comprising in combination a gun mechanism mounted on the aeroplane, a hollow projectile therefor closed at one end, a frangible closure for the other end thereof, a charge of compressed fluid in the projectile, a parachute secured to the projectile and folded about the gun mechanism, a fastening cable for the parachute, and means for breaking the closure to release the compressed fluid.

22. A safety device for aeroplanes comprising in combination a gun mechanism mounted on the aeroplane, a hollow projectile therefor closed at one end, an inwardly arched frangible closure for the other end, a charge of compressed fluid in the projectile, a parachute secured to the projectile and folded about the gun mechanism, a fastening cable for the parachute, and means for breaking the closure to release the compressed fluid.

23. A safety device for aeroplanes comprising in combination a gun mechanism mounted on the aeroplane, a hollow projectile therefor closed at one end, an annular seat at the other end thereof, a frangible cap adapted to close the open end of the projectile and bear against the said annular seat, a packing between the seat and the cap, a parachute secured to the projectile and folded about the gun mechanism, a fastening cable for the parachute, a charge of compressed fluid within the projectile and means for breaking the frangible cap to release the compressed fluid.

24. A safety device for aeroplanes comprising in combination a gun mechanism mounted on the aeroplane, a hollow projectile therefor closed at one end, an annular seat at the other end thereof, a frangible cap adapted to close the open end of the projectile and bear against the said annular seat, a packing between the seat and the cap, a viscous material adjacent the edges of the cap, a parachute secured to the projectile and folded about the gun mechanism, a fastening cable for the parachute, a charge of compressed fluid within the projectile, and means for breaking the frangible cap to release the compressed fluid.

25. A safety device for aeroplanes comprising in combination a gun mechanism mounted on the aeroplane, a projectile, a parachute secured to the projectile, means for discharging the projectile from the gun mechanism, a cable for fastening the parachute to the aeroplane and positive means for opening the parachute actuated after the projectile and parachute have traveled a predetermined distance.

26. A safety device for aeroplanes comprising in combination a gun mechanism mounted on the aeroplane, a projectile, a folded parachute secured to the projectile, a cable for fastening the parachute to the aeroplane, and means for opening the parachute actuated by the cable after the projectile and parachute have traveled a predetermined distance.

27. A safety device for aeroplanes comprising in combination a gun mechanism mounted on the aeroplane, a parachute secured to the projectile, means for discharging the projectile from the gun mechanism, a reservoir in the projectile for containing fluid under compression, an expansible tubular framework for the parachute connected to the reservoir, a closure normally preventing a flow of the fluid under compression into the framework, and means for opening the closure actuated after the projectile and parachute have traveled a predetermined distance.

28. A safety device for aeroplanes comprising in combination a gun mechanism mounted on the aeroplane, a parachute, a projectile for the gun mechanism, a means for securing the parachute to the projectile, means for discharging the projectile, a reservoir in the projectile for containing fluid under compression, an expansible tubular framework for the parachute connected to the reservoir, a frangible closure normally preventing a flow of the fluid under compression into the framework, and means for breaking the closure after the projectile and parachute have traveled a predetermined distance.

29. A safety device for aeroplanes comprising in combination a gun mechanism, a projectile, a parachute secured to the projectile, means for discharging the projectile, a fastening cable for the parachute, a reservoir in the projectile for containing fluid under compression, an expansible tubular framework for the parachute connected to the reservoir, valve mechanism normally preventing a flow of the fluid under compression into the framework actuated by the cable to release the said fluid after the projectile and parachute have traveled a predetermined distance.

30. A safety device for aeroplanes comprising in combination a gun mechanism mounted on the aeroplane, a hollow projectile therefor closed at one end, an annular seat at the other end thereof, a frangible cap for closing the open end of the projectile adapted to bear against said seat, a packing between the seat and the cap, an elastic adhesive seal about the edge of the cap, a parachute secured to the projectile, a fastening cable for the parachute, a charge of compressed fluid in the projectile, and means for breaking the frangible cap to release the fluid under compression.

31. A safety device for aeroplanes comprising in combination a gun mechanism mounted on the aeroplane, a projectile therefor, a parachute secured to the projectile, means for discharging or firing the gun mechanism to project the projectile clear of the aeroplane, and a safety means for preventing movement or discharge of the projectile should the firing or discharging means be accidentally actuated.

32. A safety device for aeroplanes comprising in combination a gun mechanism mounted on the aeroplane and hinged thereto normally lying in a substantially horizontal plane, a projectile therefor, a parachute secured to the projectile, means for moving the gun to substantially vertical position, a firing or discharging means for projecting the projectile from the gun mechanism, and means for preventing the discharge of the projectile from the gun mechanism should the firing or discharging means be accidentally actuated while the gun mechanism is in substantially horizontal position.

33. A safety device for aeroplanes comprising in combination a gun mechanism hinged to the aeroplane normally lying in a substantially horizontal position, a projectile therefor, a parachute secured to the projectile, means for moving the gun to substantially vertical position, a locking means for normally locking the gun mechanism against vertical movement, and means for releasing said locking means.

34. A safety device for aeroplanes comprising in combination a gun mechanism hinged to the aeroplane normally lying in a substantially horizontal position, a projectile therefor, a parachute secured to the projectile, spring means for moving the gun mechanism to substantially vertical position, a locking means for normally locking the gun mechanism against movement toward the vertical, and means for releasing said locking means.

35. A safety device for aeroplanes comprising in combination a gun mechanism hinged to the aeroplane normally lying in a substantially horizontal position, a projectile therefor, a parachute secured to the projectile, means for moving the gun mechanism to substantially vertical position, a locking means adjacent the muzzle of the gun mechanism and a locking means adjacent the base of the gun mechanism for normally locking the gun mechanism against movement toward the vertical, and means for releasing the said two locking means successively.

36. A safety device for aeroplanes comprising in combination a gun mechanism hinged to the aeroplane and normally lying in a substantially horizontal position, a projectile therefor, a parachute secured to the projectile, means for moving the gun mechanism to substantially vertical position, a locking means for normally locking the gun mechanism against movement toward the vertical, a release rod for said locking means, a handle for operating the release rod, and means for locking said handle against movement when the position of the aeroplane is at a predetermined angle to normal horizontal position.

37. A safety device for aeroplanes comprising a projectile, a folded parachute secured thereto folded in concentric folds, a fastening cable for the parachute, and means mounted on the aeroplane structure for projecting the projectile and the parachute in folded position clear of the aeroplane, the said cable being adapted to strip the folds of the parachute over the projectile.

38. A safety device for aeroplanes comprising in combination a folded parachute folded in radial and concentric folds, mechanism for positively discharging the parachute in folded position clear of the aeroplane, comprising, a gun, a projectile, means for fastening the parachute to the projectile, and means for discharging the projectile from the gun, and a flexible cable for fastening the parachute to the aeroplane adapted to strip the folds of the parachute over the projectile after the projectile has traveled a predetermined distance.

39. A safety device for aeroplanes comprising a projectile, a parachute secured thereto, a gun mechanism for discharging the projectile from the aeroplane, the said parachute being folded in radial folds and back and forth on itself in folds substantially parallel to the peripheral edge thereof, and a fastening cable for the parachute adapted to strip the folds of the parachute over the projectile.

40. A safety device for aeroplanes comprising in combination a projectile, a parachute secured thereto, a gun mechanism for discharging the projectile from the aeroplane, and a fastening cable for the parachute, the said parachute being folded in radial folds and back and forth on itself in folds substantially parallel to the peripheral edge thereof, the last of said folds being on the outside and being secured to the fastening cable.

41. A safety device for aeroplanes comprising in combination a folded parachute, a flexible cable for fastening the parachute, a means for positively projecting the parachute from the aeroplane, and a positive means for opening the parachute after it has traveled a predetermined distance from the aeroplane.

42. A safety device for aeroplanes comprising in combination a folded parachute, a flexible fastening cable therefor, a means for positively projecting the parachute from the aeroplane, and pneumatic means for opening the parachute after the parachute has traveled a predetermined distance from the aeroplane.

43. A safety device for aeroplanes comprising in combination a folded parachute, a flexible fastening cable therefor, a destructible protecting casing for the parachute, means for positively projecting the parachute from the aeroplane, and means operable by the cable for destroying the casing after the parachute has traveled a predetermined distance from the aeroplane.

44. A safety device for aeroplanes comprising in combination a folded parachute, a flexible fastening cable therefor, and means for positively projecting the parachute from the aeroplane, the said parachute being provided at its edge with an inwardly projecting flap adapted to fully distend the parachute by reason of the pressure exerted thereon by the air confined within the parachute.

45. A safety device for aeroplanes comprising in combination a gun mechanism, a projectile therefor, a parachute secured to the projectile and folded about the projectile, a fastening cable for the parachute, a destructible protecting cover for the parachute, means for projecting the projectile from the gun mechanism, and means operable by the cable for removing the protecting cover from the parachute after the projectile and parachute have traveled a predetermined distance.

46. A safety device for aeroplanes comprising in combination a gun mechanism, a projectile therefor, a casing about the projectile, a parachute secured to the projectile and folded about the casing in radial and concentric folds, a cover, means for securing the end of the cover against the casing, a fastening cable for the parachute, means for projecting the projectile from the gun mechanism, the said means for securing the end of the cover against the casing being released by the said cable after the projectile and parachute have traveled a predetermined distance.

47. A safety device for aeroplanes comprising in combination a gun mechanism, a projectile therefor, a casing for the projectile, a parachute secured to the projectile and folded about the casing in radial and concentric folds, a destructible protecting envelop for the parachute, a ring for clamping the end of the envelop against the casing, a cable for fastening the parachute, said cable being adapted to release the clamping ring, and means for destroying the envelop after the parachute and projectile have traveled a predetermined distance.

48. A safety device for aeroplanes comprising in combination a gun mechanism, a projectile therefor, a folded parachute secured to the projectile, a destructible protecting envelop for the parachute, a cable for fastening the parachute, guy ropes for the parachute secured to the cable, and means for projecting the projectile from the gun mechanism, the said guy ropes being folded on opposite sides of the envelop so as to tear the same after the projectile and parachute have traveled a predetermined distance.

49. A safety device for aeroplanes comprising in combination a gun mechanism, a projectile therefor provided with a casing, a parachute secured to the projectile and folded about the casing, a shield secured to the casing, a fastening cable for the parachute coiled between the shield and the casing, a destructible envelop for the parachute, a ring secured to the said cable adapted to clamp the end of the envelop to the shield, and means for projecting the projectile from the gun mechanism, the said ring being freed from the shield to release the end of the envelop by the cable after the projectile has traveled a predetermined distance, and means for destroying the envelop to release the parachute.

50. A safety device for aeroplanes comprising in combination a gun mechanism, a projectile therefor, a casing secured to the projectile, a parachute folded about the casing in radial and concentric folds and secured to the projectile, a destructible protecting envelop for the parachute, guy ropes for the parachute folded back and forth over the envelop radially, a fastening cable for the parachute secured to the guy ropes, and means for projecting the projectile from the aeroplane, the said guy ropes being so arranged on the envelop as to destroy it after the projectile and parachute have traveled a predetermined distance.

51. A safety device for aeroplanes comprising in combination, a projectile, a gun mechanism for discharging the projectile, a parachute secured to the projectile, a cable for fastening the parachute to the aeroplane, and means for operating the gun mechanism adapted to stop the aeroplane engine when said means is actuated.

52. A safety device for aeroplanes comprising in combination, a gun mechanism mounted on the aeroplane, a hollow projectile mounted therein having a propelling agent contained therein adapted to react against the breech of the gun, when released from the projectile, a parachute secured to the projectile, and means for releasing the propelling agent.

53. A safety device for aeroplanes comprising in combination, a projectile, a gun mechanism for discharging the projectile clear of the aeroplane, a parachute secured to the projectile, a cable for fastening the parachute to the aeroplane, and a friction tension controlling mechanism for the cable.

54. A safety device for aeroplanes comprising in combination, a gun mechanism mounted on the aeroplane, a hollow projectile mounted therein having a compressed fluid propelling agent adapted to react against the breech of the gun mechanism when released, a parachute secured to the projectile, and means for releasing the compressed fluid.

55. A safety device for aeroplanes comprising in combination, a parachute, mechanism for positively discharging the parachute from the aeroplane, a cable for fastening the parachute, and a friction tension controlling mechanism for the cable.

56. A safety device for aeroplanes comprising in combination a parachute, a mechanism for positively discharging the parachute from the aeroplane, a cable for fastening the parachute, and a friction tension controlling mechanism automatically increasing the tension on the cable as the parachute and aeroplane continue to separate.

57. A safety device for aeroplanes comprising in combination a gun mechanism mounted on the aeroplane, a projectile, a parachute secured to the projectile, means for discharging the projectile from the gun mechanism, a cable for fastening the parachute to the aeroplane, and positive means for unfolding the parachute actuated after the projectile and parachute have traveled a predetermined distance.

58. A safety device for aeroplanes comprising in combination, a folded parachute, a projectile, a gun mechanism for discharging the projectile, means for fastening the parachute to the projectile, and a fastening cable secured to the parachute and adapted to release the folds thereof at a predetermined point, the said cable having a permanent anchorage on the aeroplane at a point substantially over the center of gravity thereof, and a temporary releasable anchorage at a point adjacent the gun mechanism, so arranged that, previous to the opening of the parachute, the pull of the projectile on the cable will be on an axis substantially coincident with the axis of the gun mechanism when the projectile is discharged therefrom, and subsequent to the opening of the parachute the pull of the projectile on the cable will be over the center of gravity of the aeroplane.

59. A safety device for aeroplanes comprising in combination a gun mechanism, a projectile therefor, a folded parachute secured to the projectile, a destructible protecting cover for the parachute, a cable for fastening the parachute, guy ropes for the parachute secured to the cable, and means for projecting the parachute and projectile from the gun mechanism, one of said guy ropes being folded on opposite sides of the said cover so as to tear the same after the projectile and parachute have traveled a predetermined distance.

60. A safety device for aeroplanes comprising a parachute, a cable for fastening the parachute to the aeroplane, and a tension controlling mechanism for the cable adapted to gradually transfer the load of the aeroplane to the parachute after the parachute has opened.

61. A safety device for aeroplanes comprising a parachute, a cable for fastening the parachute to the aeroplane, and a feed device for feeding out the cable under a gradually increasing resistance after the parachute has opened.

62. A safety device for aeroplanes comprising a parachute, a cable for fastening the parachute to the aeroplane, and a feed device for the cable comprising a drum upon which the cable is wound, and resistance mechanism operated by the feeding out of the cable adapted to gradually retard the rotation of the drum after the parachute has opened.

63. A safety device for aeroplanes comprising in combination, a parachute, a cable for fastening the parachute to the aeroplane, and a feed device for the cable comprising a drum upon which the cable is wound, and friction members engaging the drum with gradually increasing pressure as the cable feeds out.

64. A safety device for aeroplanes comprising in combination, a parachute, a cable for fastening the parachute to the aeroplane, and a feed device for the cable comprising a drum upon which the cable is wound, friction members engaging the drum and yielding means gradually increasing the pressure of the friction members on the drum as the cable feeds out.

65. A safety device for aeroplanes comprising a parachute, a cable for fastening the parachute to the aeroplane, and a feed device for the cable having an increasing ratio of increase of resistance to the feeding out of the cable after the parachute has opened.

66. In a safety device for aeroplanes, in combination a parachute, a fastening cable therefor, and a friction tension controlling mechanism for the cable.

67. In a safety device for aeroplanes, in combination a parachute, a fastening cable therefor, and a feed device for the cable comprising a drum upon which the cable is spirally wound, the sides of the said drum being adapted to press against the cable.

68. A safety device for aeroplanes comprising in combination a projectile, a parachute folded about the projectile and adapted to strip over the rear of the projectile when unfolding, a fastening cable for the parachute having a temporary releasable anchorage and a permanent anchorage to the flying machine, and a feed device for the cable between the permanent and releasable anchorages, the said releasable anchorage being adapted to release after the folds of the parachute have stripped down over the projectile.

69. A safety device for aeroplanes comprising in combination a parachute adapted to be discharged from the aeroplane in a folded position, a frame of collapsible tubing attached to the parachute having radial tubes communicating with the peripheral tube of the frame, and a compressed fluid reservoir mounted in the parachute and adapted to discharge the fluid into the tubes and cause them to inflate.

70. A safety device for aeroplanes comprising in combination a parachute adapted to be discharged from the aeroplane in a folded position, a frame of collapsible tubes communicating with one another attached to the parachute, a compressed fluid reservoir attached to the parachute adapted to discharge into the tubes, mechanism for controlling the discharge of the fluid and automatic means for operating the discharge controlling mechanism.

71. A safety device for aeroplanes comprising in combination a parachute adapted to be discharged from the aeroplane in a folded position, a frame of collapsible tubes communicating with one another attached to the parachute, a compressed fluid reservoir attached to the parachute adapted to discharge into the tubes, mechanism for controlling the discharge of the fluid and automatic means for operating the discharge controlling mechanism after the parachute has traveled a predetermined distance.

72. In a safety device for aeroplanes the combination of a parachute adapted to be discharged from the aeroplane in a folded position, a fastening cable permanently anchored to the aeroplane at one end and to the parachute at the other, a temporary connection for the cable between the parachute and the permanent anchorage adapted to anchor the cable when the parachute is being discharged and is unfolding and release the cable when the parachute is unfolded, and shock absorbing means in the temporary connection.

73. A safety device for aeroplanes comprising in combination a parachute held in confined folded position, a fastening cable for the parachute, mechanism for releasing the parachute into operative position, and means in the release mechanism for locking the said mechanism when the aeroplane is at a predetermined angle to normal horizontal position.

74. In a safety appliance for aeroplanes, the combination of a parachute adapted to be discharged from the aeroplane in folded position, guy ropes for the parachute, a fastening cable secured to the guy ropes, and means for retaining the parachute in confined folded position, the said guy ropes being folded back and forth radially and side by side along the folded parachute and being releasably held in place by the said retaining means.

75. A safety device for aeroplanes comprising in combination a folded parachute adapted to be discharged from the aeroplane in folded position, a plurality of guy ropes for the parachute, a fastening cable secured to the guy ropes, a retaining cover for holding the parachute in confined folded position, and a separate compartment for each guy rope in the cover arranged parallel with one another and extending longitudinally from front to rear of the cover adapted to receive the guy ropes.

76. In a safety appliance for aeroplanes, the combination of a parachute adapted to be discharged from the aeroplane in folded position, guy ropes for the parachute, a fastening cable secured to the guy ropes and a destructible cover for the parachute adapted to hold it in folded position, and compartments in the cover, the said guy ropes being folded about the cover separately in the compartments and adapted to pull out of the compartments and destroy the said cover.

77. A safety device for aeroplanes comprising a folded parachute, a temporary anchorage for the parachute adapted to hold the parachute while its folds are being stripped and release the parachute when the folds are stripped, means positively opening the parachute after the folds are stripped, a cable for fastening the parachute to the aeroplane, and means for discharging the parachute in folded position clear of the aeroplane.

78. A safety device for aeroplanes comprising a folded parachute releasably mounted upon the aeroplane, confining means adapted to hold the folds in confined folded position, and guy ropes for the parachute folded back and forth along the exterior of the parachute adapted to open the confining means as they are pulled from folded position, means for releasing the parachute from the aeroplane, and a cable for securing the parachute to the aeroplane.

79. A safety device for aeroplanes comprising a folded parachute releasably mounted upon the aeroplane, confining means adapted to hold the folds in confined folded position, and a rope extending along the exterior of the parachute adapted to open the confining means after the parachute has traveled a predetermined distance.

80. A safety device for aeroplanes, comprising in combination a parachute, a tension control device for the cable, and means for applying a predetermined tension to the cable as the load of the aeroplane is being transmitted to the parachute after it has opened.

In testimony whereof I have hereunto subscribed my name in the presence of the two subscribed witnesses.

JULIAN H. KENDIG.

Witnesses:
HARVEY L. LECHNER,
DOERING BELLINGER.